United States Patent
Komada

(10) Patent No.: US 12,439,912 B2
(45) Date of Patent: Oct. 14, 2025

(54) AGRICULTURAL CHEMICAL PREPARATION CONTAINING DIFENOCONAZOLE, AND METHOD FOR STABILIZING SAID AGRICULTURAL CHEMICAL PREPARATION

(71) Applicant: ISHIHARA SANGYO KAISHA, LTD., Osaka (JP)

(72) Inventor: Hyuji Komada, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 528 days.

(21) Appl. No.: 17/422,574

(22) PCT Filed: Feb. 3, 2020

(86) PCT No.: PCT/JP2020/003991
§ 371 (c)(1),
(2) Date: Jul. 13, 2021

(87) PCT Pub. No.: WO2020/162416
PCT Pub. Date: Aug. 13, 2020

(65) Prior Publication Data
US 2022/0095611 A1    Mar. 31, 2022

(30) Foreign Application Priority Data
Feb. 5, 2019 (JP) .................. 2019-019113

(51) Int. Cl.
| | |
|---|---|
| A01N 25/22 | (2006.01) |
| A01N 25/04 | (2006.01) |
| A01N 25/30 | (2006.01) |
| A01N 43/10 | (2006.01) |
| A01N 43/40 | (2006.01) |
| A01N 43/50 | (2006.01) |
| A01N 43/653 | (2006.01) |

(52) U.S. Cl.
CPC ............ *A01N 25/22* (2013.01); *A01N 25/04* (2013.01); *A01N 25/30* (2013.01); *A01N 43/10* (2013.01); *A01N 43/40* (2013.01); *A01N 43/50* (2013.01); *A01N 43/653* (2013.01)

(58) Field of Classification Search
None
See application file for complete search history.

(56) References Cited

U.S. PATENT DOCUMENTS

| | | |
|---|---|---|
| 9,485,987 B2 | 11/2016 | Sato |
| 2002/0040044 A1 | 4/2002 | Schlatter |
| 2013/0171226 A1* | 7/2013 | Awazu .................. A01N 25/04 514/355 |
| 2020/0045969 A1 | 2/2020 | Yang et al. |

FOREIGN PATENT DOCUMENTS

| | | |
|---|---|---|
| CN | 103749466 A | 4/2014 |
| CN | 107897199 A | 4/2018 |
| CN | 108902160 A | 11/2018 |
| CN | 109042636 A | 12/2018 |
| CN | 109247332 A | 1/2019 |
| JP | 2002-532395 A | 10/2002 |
| JP | 6200436 B2 | 9/2017 |
| JP | 6375075 B1 | 8/2018 |
| WO | 2011/135833 A1 | 11/2011 |

OTHER PUBLICATIONS

International Search Report issued in International Bureau of WIPO Patent Application No. PCT/JP2020/003991, dated Apr. 21, 2020, along with an English translation thereof.
International Preliminary Report on Patentability issued in International Bureau of WIPO Patent Application No. PCT/JP2020/003991, dated Aug. 10, 2021.
First Examination Report dated Feb. 21, 2025, issued in Australian patent application No. 2020218985.

\* cited by examiner

*Primary Examiner* — Ali Soroush
*Assistant Examiner* — Afua Bamfoaa Boateng
(74) *Attorney, Agent, or Firm* — GREENBLUM & BERNSTEIN, P.L.C.

(57) ABSTRACT

An agricultural formulation containing difenoconazole, having improved storage stability by suppressing crystal growth of the active ingredient in the agricultural formulation is provided. An agricultural formulation includes (a) difenoconazole and (b) at least one surfactant selected from the group consisting of a polycarboxylate-based surfactant and a lignosulfonate-based surfactant.

19 Claims, No Drawings

AGRICULTURAL CHEMICAL PREPARATION CONTAINING DIFENOCONAZOLE, AND METHOD FOR STABILIZING SAID AGRICULTURAL CHEMICAL PREPARATION

TECHNICAL FIELD

The present invention relates to a stabilized agricultural formulation containing difenoconazole, The agricultural formulation of the present invention is used for the purpose of disease control in agricultural and horticultural fields.

BACKGROUND ART

Difenoconazole is, as described in The Pesticide Manual (Sixteenth Edition), pages 341 to 343, known as a triazole fungicide having controlling effects on various plant diseases by inhibiting sterol demethylation of cell membranes of filamentous fungi.

Many of triazole fungicides have low solubility in water but have high solubility in a solvent containing additives such as a surfactant, and thus when a triazole fungicide is formulated into a water-based suspension, during long term storage, crystals of the active ingredient may grow by Ostwald ripening. When the crystals of the active ingredient in the water-based suspension grow, flowability of the active ingredient disappears, active ingredient particles aggregate and form a hard cake, and such a water-based suspension loses its commercial value as an agricultural chemical.

Patent Document 1 discloses an aqueous suspension containing a triazole fungicide, comprising a surfactant such as tristyrylphenol ethoxylate or its salt, in combination with a composition containing any one of a vinylpyrrolidon homopolymer, a vinylpyrrolidon/styrene block polymer, a hydrophilic ethylene oxide-propylene oxide block polymer, and a mixture thereof for the prevention of crystal growth of the triazole fungicide in the suspension. However, it failed to disclose use of a polycarboxylate-based surfactant or a lignosulfonate-based surfactant.

Patent Document 2 discloses use of butylnaphthalene sulfonate salt condensed with formalin as a particle growth suppressing agent for an oil-based suspension, however, it failed to disclose use of a polycarboxylate-based surfactant or a lignosulfonate-based surfactant.

Patent Document 3 discloses to incorporate, to an agrochemical composition in the form of an aqueous suspension, an alkylnaphthalene sulfonate formalin condensate and one or more selected from the group consisting of alkyl sulfates, polyoxyalkylene alkyl ether sulfates, alkyl phosphates and salts thereof, polyoxyalkylene alkyl ether phosphates and salts thereof, and polyoxyalkylene alkyl ether acetates and salts thereof, thereby to suppress crystal growth of the agriculturally active ingredient. However, it failed to disclose use of a polycarboxylate-based surfactant or a lignosulfonate-based surfactant.

PRIOR ART DOCUMENTS

Patent Documents

Patent Document 1: JP-A-2002-532395
Patent Document 2: Japanese Patent No. 6375075
Patent Document 3: Japanese Patent No. 6200436

DISCLOSURE OF INVENTION

Technical Problem

The object of the present invention is to suppress crystal growth of an active ingredient in an agricultural water-based suspension containing difenoconazole (hereinafter sometimes referred to simply as agricultural formulation) thereby to improve storage stability of the agricultural formulation.

Solution to Problem

The present inventor has conducted extensive studies to achieve the above object and as a result, found that by using a specific surfactant that is a polycarboxylate-based surfactant or a lignosulfonate-based surfactant, a physically stable agricultural formulation containing difenoconazole, having crystal growth of the active ingredient in the composition suppressed, can be obtained, and has accomplished the present invention. That is, the present invention relates to an agricultural formulation comprising (a) difenoconazole and (b) at least one surfactant selected from the group consisting of a polycarboxylate-based surfactant and a lignosulfonate-based surfactant (hereinafter sometimes referred to simply as the surfactant of the present invention).

Advantageous Effects of Invention

According to the present invention, it is possible to improve storage stability of an agricultural formulation containing difenoconazole, and it is possible to provide a physically stabilized agricultural formulation containing difenoconazole.

DESCRIPTION OF EMBODIMENTS

The mixing weight ratio of (a) difenoconazole to (b) the surfactant of the present invention (difenoconazole: the surfactant of the present invention) is preferably from 1:300 to 300:1, more preferably from 1:100 to 100:1, particularly preferably from 1:10 to 10:1.

(b) The surfactant of the present invention is at least one member selected from the group consisting of a polycarboxylate-based surfactant and a lignosulfonate-based surfactant, and the polycarboxylate-based surfactant or the lignosulfonate-based surfactant may be used alone or they may be used as mixed. A higher crystal growth suppression effect may sometimes be obtained when used as mixed. When they are used as mixed, their mixing weight ratio (polycarboxylate-based surfactant: lignosulfonate-based surfactant) is preferably from 1:100 to 100:1, more preferably from 1:50 to 50;1, particularly preferably from 1:5 to 5:1.

The polycarboxylate-based surfactant of the present invention may be a polycarboxylic acid such as an acrylic acid graft polymer, a styrene/acrylic acid polymer, a styrene/methacrylic acid polymer or a methacrylic acid polymer, or a salt thereof, and the salt may, for example be a salt with an alkali metal such as sodium or potassium, a salt with an alkaline earth metal such as calcium or magnesium, an ammonium salt, or a salt with an amine such as an alkylamine, a cycloalkylamine or an alkanolamine. The polycarboxylate-based surfactant is preferably an acrylic acid graft polymer, a styrene/acrylic acid polymer sodium salt, a styrene/methacrylic acid polymer sodium salt or a methacrylic acid polymer calcium salt. As commercial polycarboxylate-based surfactants available in this technical field, for example, a sodium salt of acid resin copolymer (TERSPERSE 2700, tradename, manufactured by HUNTSMAN), a styrene/acrylic acid polymer sodium salt (Atlox Metasperse 500L, Atlox Metasperse 550S, tradename, manufactured by Croda), a methacrylic acid polymer calcium salt (AQUALOC PM-006, tradename, manufactured by NIPPON SHOKUBAI CO., LTD.), an acrylic acid graft polymer (Tersperse 2500, tradename, manufactured by HUNTSMAN), and an acrylic acid graft polymer (Atlox 4913; tradename, manufactured by Croda) may be mentioned.

The lignosulfonate-based surfactant of the present invention may, for example, be lignin sulfonic acid or a salt thereof, and the salt may, for example, be a salt with an alkali metal such as sodium or potassium, a salt with an alkaline earth metal such as magnesium or calcium, or an ammonium salt. The lignosulfonate-based surfactant is, specifically, suitably sodium lignosulfonate or calcium lignosulfonate, and as commercial lignosulfonate-based surfactants available in this technical field, for example, sodium lignosulfonate (Ultrazine NA, tradename, manufactured by Borregaard), calcium lignosulfonate (Borresperse CA, tradename, manufactured by Borregaard), and sodium lignosulfonate (Marasperse AG, Marasperse N22, Ufoxane 3A, tradename, manufactured by Borregaard) may be mentioned.

The content of (a) difenoconazole is, to the total amount of the agricultural formulation of the present invention, preferably from 0.3 to 90 wt %, more preferably from 0.5 to 80 wt %, further preferably from 0.5 to 50 wt %.

The content of (b) the surfactant of the present invention is, to the total amount of the agricultural formulation of the present invention, preferably from 0.3 to 50 wt %, more preferably from 0.5 to 20 wt %, further preferably from 1 to 10 wt %, To the agricultural formulation of the present invention, as the case requires, agricultural adjuvants such as other surfactant (excluding the surfactant of the present invention), an anti-freezing agent, an anti-settling agent, an antifoaming agent, a preservative, a dispersing agent, a wetting agent, a pH adjusting agent and a stabilizer may properly be added. The agricultural adjuvants may be prepared in accordance with a conventional method in this technical field.

Such other surfactant may, for example, be an anionic surfactant such as a salt of fatty acid, a benzoate, an alkylsulfosuccinate, a dialkylsulfosuccinate, a salt of alkylsulfuric acid ester, an alkyl sulfate, an alkyl diglycol ether sulfate, a salt of alcohol sulfuric acid ester, an alkyl sulfonate, an alkyldiphenyl ether disulfonate, a polystyrene sulfonate, a salt of alkylphosphoric acid ester, an alkylaryl phosphate, a styrylaryl phosphate, a salt of polyoxyethylene alkyl ether sulfuric acid ester, a polyoxyethylene alkylaryl ether sulfate, a polyoxyethylene styrlaryl ether sulfate, an ammonium salt of polyoxyethylene styrylaryl ether sulfate, a salt of polyoxyethylene alkylaryl ether sulfuric acid ester, a polyoxyethylene alkyl ether phosphate, a salt of polyoxyethylene alkylaryl phosphoric acid ester, a polyoxyethylene styrylaryl ether phosphate, or a salt thereof; a nonionic surfactant such as a sorbitan fatty acid ester, a glycerin fatty acid ester, a fatty acid polyglyceride, a fatty acid alcohol polyglycol ether, acetylene glycol, acetylene alcohol, an oxyalkylene block polymer, a polyoxyethylene alkyl ether, a polyoxyethylene alkylaryl ether, a polyoxyethylene styrylaryl ether, a polyoxyethylene glycol alkyl ether, a polyoxyethylene fatty acid ester, a polyoxyethylene sorbitan fatty acid ester, a polyoxyethylene sorbitol fatty acid ester, a polyoxyethylene glycerin fatty acid ester, polyoxyethylene hydrogenated castor oil, polyoxyethylene castor oil or a polyoxypropylene fatty acid ester; or a cationic surfactant such as an alkoxylated fatty acid amine; and as the case requires, two or more of them may be used as mixed. The content of the surfactant is, to the total amount of the agricultural formulation of the present invention, preferably from 0 to 15 wt %, more preferably from 2 to 5 wt %.

The anti-freezing agent is preferably a dihydric alcohol, and is specifically, an alkylene glycol such as ethylene glycol or propylene glycol, and is particularly preferably propylene glycol. The dihydric alcohol also has a function as a viscosity-decreasing agent and may decrease the viscosity and thereby improve flowability of the agricultural formulation, in addition to the anti-freezing effect. The content of the anti-freezing agent is, to the total amount of the agricultural formulation of the present invention, preferably from 2 to 30 wt %, more preferably from 5 to 15 wt %

The anti-settling agent may, for example, be a natural polysaccharide such as xanthan gum, rhamsan gum, Locust bean gum, carrageenan or Welan gum; a synthetic polymer such as sodium polyacrylate; a semisynthetic polysaccharide such as carboxymethyl cellulose; a mineral powder such as magnesium aluminum silicate, smectite, bentonite, hectorite or fumed silica, or alumina sol, and as the case requires, two or more of them may be used as mixed. The content of the anti-settling agent is, to the total amount of the agricultural formulation of the present invention, preferably from 0.01 to 5.0 wt %, more preferably from 0.05 to 2.5 wt %.

The preservative may, for example, be an isothiazolinone preservative such as benzisothiazolin-3-one, 2-methyl-4-isothiazolin-3-one, 5-chloro-2-methyl-4-isothiazolin-3-one, or 4,5-dichloro-2-octyl-4-isothiazolin-3-one as an active ingredient. Specifically, Proxel GXL (tradename, manufactured by Lonza), Amebact B20X (tradename, manufactured by Azelis), and Aciticide B20 (tradename, manufactured by THOR) may, for example, be mentioned. The content of the preservative is, to the total amount of the agricultural formulation of the present invention, preferably from 0.01 to 1.0 wt %, more preferably from 0,05 to 0.2 wt %.

The antifoaming agent may, for example, be a silicone antifoaming agent containing polydimethylsiloxane as an active ingredient, or silica. Specifically, SILCOLAPSE 432 (tradename, manufactured by Bluestar silicones), SILFOAM SC 120 (tradename, manufactured by Wacker Asahikasei Silicone Co., Ltd.), SAG 1572 (tradename, manufactured by Momentive) may, for example, be mentioned, and as the case requires, silica may be used as mixed. The content of the antifoaming agent is, to the total amount of the agricultural formulation of the present invention, preferably from 0.01 to 10 wt %, more preferably from 0.1 to 1.0 wt %.

As a method for producing the agricultural formulation of the present invention, for example, sodium lignosulfonate and a sodium salt of acid resin copolymer or a methacrylic acid polymer calcium salt are added to water and mixed, an agriculturally active ingredient is added to the mixture and as the case requires, other adjuvants are added, followed by preliminary grinding e.g. by a homogenizer, and by fine grinding by a wet grinding machine e.g. with glass beads to a predetermined particle size, and then additives such as a thickener are added, followed by mixing. Otherwise, an agriculturally active ingredient is subjected to dry grinding together with adjuvants such as a surfactant, and the ground product is added to water in which sodium lignosulfonate, a sodium salt of acid resin copolymer or a methacrylic acid polymer calcium salt and other adjuvants are dissolved, followed by preliminary grinding e.g. by a homogenizer, and by fine grinding by a wet grinding machine e.g. with glass beads to a predetermined particle size, and then adjuvants such as a thickener are added, followed by mixing. The active ingredient component is ground to a particle size of preferably from about 0.1 to about 5 μm, preferably to a particle size depending upon the physical properties of the agriculturally active ingredient.

The grinding machine to be used when the agricultural formulation of the present invention is produced may, for example, be a wet grinding machine such as a bead mill, a vibrating mill or a planetary mill, and for example, PAINT SHAKER (manufactured by Toyo Seiki Seisaku-sho, Ltd.), Nano Pulverizer NP-100 (manufactured by THINKY CORPORATION), DYNO-MILL KD (manufactured by Willy A. Bachofen AG), Ready Mill model RMH (manufactured by AIMEX CO., LTD) may be used. As the beads to be used, glass beads, zirconia beads or zircon beads may, for example, be mentioned. The bead particle size is preferably within a range of from 0.01 to 1.5 mm, more preferably from 0.5 to 1.0 mm. A water-based suspension with a small average particle size can be produced by using beads having a small particle size.

The average particle size of the agriculturally active ingredient may be measured by a laser diffraction particle size distribution measuring apparatus such as MICROTRAC MT3300-EXII (manufactured by NIKKISO CO., LTD.) or Mastersizer 3000 (manufactured by Malvern Panalytical Ltd). Measurement is conducted while the sample is dispersed in water when MICTROTRAC MT3300-EXII is used.

The viscosity of the agricultural formulation of the present invention may be measured, for example, by a viscometer TVB-10 (manufactured by Toki Sangyo Co, Ltd.) or Brook Field viscometer (manufactured by Brookfield). Measurement is conducted, when viscometer TVB-10 is used, at a sample liquid temperature of 20° C. at a number of revolutions of 60 rpm using M2 rotor or M3 rotor.

The concentration of the agricultural formulation of the present invention at the time of its use cannot generally be defined since it varies depending upon e.g. the type of plants to be controlled, the method of applying the formulation, the formulation type and the dose, and in the case of foliar treatment, the concentration of difenoconazole is preferably from 0.1 to 10,000 ppm, more preferably from 1 to 10,000 ppm, further preferably from 10 to 1,000 ppm, in the case of soil application, the amount of difenoconazole is preferably from 0.1 g/a to 10,000 g/a, more preferably from 1 g/a to 1,000 g/a, further preferably from 10 g to 100 g/a, and in the case of seed treatment, the amount of difenoconazole is, per 100 kg of the weight of seeds, preferably from 1 g to 2,000 g, more preferably from 3 g to 700 g, further preferably from 10 g to 400 g.

The agricultural formulation of the present invention may further contain, as the case requires, as a fungicide other than difenoconazole, one or more fungicides in combination. Such other fungicide is preferably a solid active ingredient having a low solubility in water, and having a solubility of preferably at most 100 ppm at 20° C., more preferably at most 80 ppm.

The above other fungicide may, for example, be at least one member selected from the group consisting of cyazofamid, amisulbrom, fluazinam, pyriofenone, metrafenone, isofetamid, boscalid and fluopyram, preferably at least one member selected from the group consisting of cyazofamid, pyriofenone and isofetamid, more preferably cyazofamid.

The mixing weight ratio of (a) difenoconazole to other fungicide is preferably from 1:100 to 100:1, more preferably from 1:50 to 50:1, further preferably from 1:10 to 10:1. It is furthermore preferably from 1:2 to 2:1, whereby a higher crystal growth suppression effect will be obtained.

The agricultural formulation of the present invention may further be mixed with or used in combination with other agricultural chemicals, such as a fungicide, an insecticide, an acaricide, a nematicide, a soil insect pesticide, an antivirus agent, an attractant, a herbicide, a plant growth regulating agent, etc., as the case requires.

The active ingredient compounds of a fungicide in the above-mentioned other agricultural chemicals may properly be selected, for example, from the following group of compounds (by common names). In a case where these compounds have their salts, alkyl esters, various structural isomers such as optical isomers, etc., all of them are included, even if no specific disclosure thereof is made.

Anilinopyrimidine compounds such as mepanipyrim, pyrimethanil and cyprodinil;

triazolopyrimidine compounds such as ametoctradin;

azole compounds such as triadimefon, bitertanol, triflumizole, etaconazole, propiconazole, penconazole, flusilazole, myclobutanil, cyproconazole, tebuconazole, hexaconazole, furconazole-cis, prochloraz, metconazole, epoxiconazole, tetraconazole, oxpoconazole fumarate, prothioconazole, triadimenol, flutriafol, fluquinconazole, fenbuconazole, bromuconazole, diniconazole, tricyclazole, simeconazole, pefurazoate, ipconazole, imibenconazole, azaconazole, triticonazole, imazalil, ipfentrifluconazole and mefentrifluconazole;

quinoxaline compounds such as quinomethionate;

dithiocarbamate compounds such as maneb, zineb, mancozeb, polycarbamate, metiram, propineb and thiram;

organic chlorine compounds such as fthalide, chlorothalonil and quintozene;

imidazole compounds such as benomyl, thiophanate-methyl, carbendazim, thiabendazole and fuberiazole;

cyanoacetamide compounds such as cymoxanil;

acylamino acid compounds such as metalaxyl, metalaxyl-M (another name: mefenoxam, oxadixyl, ofurace, benalaxyl, benalaxyl-M (another name: kiralaxyl, chiralaxyl), furalaxyl and valifenalate;

anilide compounds such as cyprofuram, carboxin, oxycarboxin, thifluzamide, fenhexamid, isotianil, tiadinil and pyraziflumid;

sulfamide compounds such as dichlofluanid;

copper compounds such as cupric hydroxide, oxine copper, anhydrous copper sulfate, copper nonylphenolsulfonate, copper 8-hydroxyquinoline and dodecylbenzenesulfonic acid bisethylenediamine copper(II) complex salt (another name: DBEDC);

organophosphorus compounds such as fosetyl-aluminum, tolclofos-methyl, edifenphos, iprobenfos;

phthalimide compounds such as captan, captafol and folpet;

dicarboxyimide compounds such as procymidone, iprodione and vinclozolin;

benzanilide compounds such as flutolanil, mepronil and benodanil;

amide compounds such as carpropamid, diclocymet, silthiopham and fenoxanil;

pyrazole carboxamide compounds such as benzovindiflupyr, bixafen, fluindapyr, fluxapyroxad, furametpyr, isopyrazam, penflufen, penthiopyrad, pydiflumetofen, sedaxane, isoflucypram, inpyrfluxam and pyrapropoyne;

benzamide compounds such as fluopicolide, zoxamide and fluopimomide;

flanilide compounds such as fenfuram;

piperazine compounds such as triforine;

pyridine compounds such as pyrifenox, pyrisoxazole and aminopyrifen;

pyrimidine compounds such as fenarimol, ferimzone and nuarimol;

piperidine compounds such as fenpropidin;

morpholine compounds such as fenpropimorph and tridemorph;

organotin compounds such as fentin hydroxide and fentin aetate;

urea compounds such as pencycuron;

carboxylic acid amide compounds such as dimethomorph, flumorph, pyrimorph, iprovalicarb, benthiavalicarb-isopropyl and mandipropamid;

phenyl carbamate compounds such as diethofencarb;

cyanopyrrole compounds such as fludioxonil and fenpiclonil;

strobilurin compounds such as azoxystrobin, kresoxim-methyl, metominostrobin, trifloxystrobin, picoxystrobin, oryzastrobin, dimoxystrobin, pyraclostrobin, fluoxastrobin, enestroburin, pyraoxystrobin, pyrametostrobin, coumoxystrobin, enoxastrobin, fenaminstrobin, flufenoxystrobin, triclopyricarb and mandestrobin;

oxazole compounds such as famoxadone, oxathiapiprolin and fluoxapiprolin;

thiazolecarboxamide compounds such as ethaboxam;

imidazolinone compounds such as fenamidone;

benzenesulfonamide compounds such as flusulfamide;

oxime ether compounds such as cyflufenamid;

anthraquinone compounds such as dithianon;

crotonic acid compounds such as meptyldinocap;

antibiotics such as validamycin, kasugamycin, streptomycin and polyoxins;

guanidine compounds such as iminoctadine and dodine;

quinoline compounds such as tebufloquin, quinoxyfen, quinofumelin and ipflufenoquin;

thiazolidine compounds such as flutianil;

carbamate compounds such as propamocarb hydrochloride, pyribencarb and tolprocarb;

tetrazole compounds such as picarbutrazox and metyltetraprole;

benzothiazole compounds such as probenazole and dichlobentiazox;

phenylpyrazole compounds such as fenpyrazamine;

dithiolane compounds such as isoprothiolane;

picolinamide compounds such as fenpicoxamid and florylpicoxamid;

pyridazine compounds such as pyridachlometyl;

sulfur compounds such as sulfur and lime sulfur;

other compounds such as pyroquilon, diclomezine, chloropicrin, dazomet, metam-sodium, proquinazid, spiroxamine and dipymetitrone;

microbial fungicides such as *Bacillus amyloliqefaciens* strain QST713, *Bacillus amyloliqefaciens* strain FZB24, *Bacillus amyloliqefaciens* strain MBI600, *Bacillus amyloliqefaciens* strain D747, *Pseudomonas fluorescens*, *Bacillus subtilis* and *Trichoderma atroviride* SKT-1; and plant extracts such as tea tree oil.

The insecticide, the acaricide, the nematicide or the soil insect pesticide in the above-mentioned other agricultural chemicals, that is, the active ingredient compounds of insect pest control agents, may properly be selected, for example, from the following group of compounds (by common names). In a case where these compounds have their salts, alkyl esters, various structural isomers such as optical isomers, etc., all of them are included, even if no specific disclosure thereof is made.

Organic phosphate compounds, such as profenofos, dichlorvos, fenamiphos, fenitrothion, EPN ((RS)-(O-ethyl O-4-nitrophenyl phenylphosphonothioate), diazinon, chlorpyrifos, chlorpyrifos-methyl, acephate, prothiofos, fosthiazate, cadusafos, disulfoton, isoxathion, isofenphos, ethion, etrimfos, quinalphos, dimethylvinphos, dimethoate, sulprofos, thiometon, vamidothion, pyraclofos, pyridaphenthion, pirimiphos-methyl, propaphos, phosalone, formothion, malathion, tetrachlorvinphos, chlorfenvinphos, cyanophos, trichlorfon, methidathion, phenthoate, oxydeprofos (another name: ESP), azinphos-methyl, fenthion, heptenophos, methoxychlor, parathion, phosphocarb, demeton-S-methyl, monocrotophos, methamidophos, imicyafos, parathion-methyl, terbufos, phosphamidon, phosmet and phorate;

carbamate compounds, such as carbaryl, propoxur, aldicarb, carbofuran, thiodicarb, methomyl, oxamyl, ethiofencarb, pirimicarb, fenobucarb, carbosulfan, benfuracarb, bendiocarb, furathiocarb, isoprocarb, metolcarb, xylylcarb, XMC (3,5-xylyl methylcarbamate) and fenothiocarb;

nereistoxin derivatives, such as cartap, thiocyclam, thiocyclam oxalate, thiocyclam hydrochloride, bensultap, thiosultap, monosultap (another name: thiosultap-monosodium), bisultap (another name: thiosultap-disodium) and polythialan;

organic chlorine compounds, such as dicofol, tetradifon, endosulfan, dienochlor and dieldrin;

organic metal compounds, such as fenbutatin oxide and cyhexatin;

pyrethroid compounds, such as fenvalerate, permethrin, cypermethrin, alpha-cypermethrin), zeta-cypermethrin, theta-cypermethrin, beta-cypermethrin, deltamethrin, cyhalothrin, gamma-cyhalothrin, lambda-cyhalothrin, tefluthrin, kappa-tefluthrin, ethofenprox, flufenprox, cyfluthrin, beta-cyfluthrin, fenpropathrin, flucythrinate, fluvalinate, cycloprothrin, pyrethrins, esfenvalerate, tetramethrin, resmethrin, protrifenbute, bifenthrin, kappa-bifenthrin, acrinathrin, allethrin, tau-fluvalinate, tralomethrin, profluthrin, metofluthrin, epsilon-metofluthrin, heptafluthrin, phenothrin, flumethrin, momfluorothrin, epsilon-momfluorothrin, silafluofen and chloroprallethrin;

benzoylurea compounds, such as diflubenzuron, chlorfluazuron, teflubenzuron, flufenoxuron, lufenuron, novaluron, triflumuron, hexaflumuron, bistrifluron, noviflumuron and fluazuron;

juvenile hormone-like compounds, such as methoprene, pyriproxyfen, fenoxycarb and diofenolan;

pyridazinone compounds, such as pyridaben;

pyrazole compounds, such as fenpyroximate, fipronil, ethiprole, acetoprole, pyrafluprole, pyriprole, cyenopyrafen and flufiprole;

pyrazole carboxamide compounds, such as pyflubumide, tebufenpyrad, tolfenpyrad and dimpropyridaz;

pyridylpyrazole compounds, such as chlorantraniliprole, cyantraniliprole, cyaniliprole, tetraniliprole and tyclopyrazoflor;

neonicotinoid compounds, such as imidacloprid, nitenpyram, acetamiprid, thiacloprid, thiamethoxam, clothianidin, nidinotefuran, dinotefuran and nithiazine;

hydrazine compounds, such as tebufenozide, methoxyfenozide, chromafenozide and halofenozide;

pyridine compounds, such as pyridalyl and flonicamid;

tetronic acid compounds, such as spirodiclofen and spiromesifen;

tetramic acid compounds, such as spirotetramat and spiropidion;

strobilurin compounds, such as fluacrypyrim and pyriminostrobin;

pyrimidinamine compounds, such as flufenerim and pyrimidifen;

organic sulfur compounds, such as malathion;

urea compounds such as flufenoxuron;

triazine compounds, such as cyromazine;

hydrazone compounds, such as hydramethylnon;

diamide compounds, such as flubendiamide, broflanilide, cyhalodiamide and tetrachlorantraniliprole;

thiourea compounds, such as diafenthiuron and chloromethiuron;

formamidine compounds, such as amitraz, chlordimeform and chloromebuform;

pyridinediazomethine compounds, such as pymetrozine and pyrifluquinazone;

isoxazolinone compounds, such as afoxolaner, fluralaner, fluxametamide, sarolaner and isocycloseram; and other compounds, such as buprofezin, hexythiazox, triazamate, chlorfenapyr, indoxacarb, acequinocyl, etoxazole, 1,3-dichloropropene, benclothiaz, bifenazate, propargite, clofentezine, metaflumizone, cyflumetofen, fenazaquin, amidoflumet, sulfluramid, hydramethylnon, metaldehyde, sulfoxaflor, fluensulfone, verbutin, dicloromezotiaz, triflumezopyrim, fluhexafon, tioxazafen, afidopyropen, flometoquin, flupyradifurone, fluazaindolizine, acynonapyr, benzpyrimoxan, flupyrimin and oxazosulfyl.

Further, the agricultural formulation of the present invention may be mixed with or used in combination with the following compounds.

Microbial agricultural chemicals, such as insecticidal crystal proteins produced by *Bacillus thuringiensis aizawai, Bacillus thuringiensis kurstaki, Bacillus thuringiensis israelensis, Bacillus thuringiensis japonensis, Bacillus thuringiensis tenebrionis* or *Bacillus thuringiensis*, insect viruses, entomopathogenic fungi, and nematophagous fungi:

antibiotics or semisynthetic antibiotics, such as abermectin, emamectin benzoate, ivermectin, milbemectin, milbemycin oxime, lepimectin, spinosad and spinetoram;

natural products, such as azadirachtin, rotenone, and ryanodine;

repellents, such as deet; and physical preservatives such as a paraffin oil and a mineral oil.

The agriculturally active ingredient of the present invention is known to be applied for the purpose of controlling various plant diseases. Accordingly, the agricultural formulation of the present invention has controlling effects against diseases of plants infected or possibly infected with phytopathogens, for example, Gramineae crops (such as rice, wheat, barley, oat, rye and corn), Brassicaceae crops (such as cabbage, Chinese cabbage, Japanese radish, turnip, broccoli, cauliflower and Hanana), Asteraceae crops (such as lettuce, burdock and crown daisy), Solanaceae crops (such as potato, eggplant, tomato and sweet pepper), Cucurbitaceae crops (such as cucumber, pumpkin, melon and watermelon), Allioideae crops (such as Welsh onion, Chinese chive, *Japanese shallot* and garlic), Umbelliferae crops (such as celery, carrot and parsley), Liliaceae crops (such as lily, tulip and asparagus), Polygonaceae crops (such as buckwheat), Leguminosae crops (such as soybean, kidney bean and adzuki bean), Convolvulaceae crops (such as sweet potato), Chenopodiaceae crops (such as spinach and sugar beet), Vitaceae crops (such as grape), Rosaceae crops (such as rose, strawberry, apple, pear, peach, loquat and almond), and Rutaceae crops (such as mandarin orange, lemon and orange), caused by phytopathogens, for example, *Phytophthora* spp., *Peronospora* spp., *Aphanomyces* spp., *Spongospora* spp., *Glomerella* spp., *Botryosphaeria* spp., *Alternaria* spp., *Magnaporthe* spp. *Sclerotium* spp., *Fusarium* spp., *Rhizoctonia* spp., *Verticillium* spp., *Plasmodiophora* spp., *Pythium* spp., *Rosellinia* spp., *Helicobasidium* spp., *Streptomyces* spp., *Erysiphe* spp., *Blumeria* spp., *Sphaerotheca* spp., *Oidium* spp., *Colletotrichum* spp., *Corynespora* spp., *Venturia* spp., *Gymnosporangium* spp., *Mycosphaerella* spp., *Monilinia* spp., *Exobasidiomycetidae* spp., *Pseudocercosporella* spp., and *Phakopsora* spp. Further, the agricultural formulation of the present invention has controlling effects against diseases caused by viruses such as *Olpidium* spp., *Polymyxa* spp., and *Spongospora* spp. Particularly, the agricultural formulation of the present invention has high controlling effects against diseases caused by *Phytophthora* spp., *Peronospora* spp., *Aphanomyces* spp., *Spongospora* spp., *Plasmodiophora* spp., *Pythium* spp., *Erysiphe* spp., *Blumeria* spp., *Colletotrichum* spp., *Venturia* spp. and *Gymnosporangium* spp.

The agricultural formulation of the present invention specifically has controlling effects against blast, sheath blight and Bakanae disease of rice; Take-all, powdery mildew, leaf rust, Stripe and eye spot of wheat and the like; downy mildew and powdery mildew of Brassicaceae crops, spinach, onion, pumpkin, soybean, grape, etc.; early blight, powdery mildew, stem rot, gray mold and anthracnose of potato, pepper, sweet pepper, watermelon, pumpkin, tobacco, tomato, strawberry, cucumber, etc.; Fusarium basal rot, leaf rust and gray-mold neck rot of onion, powdery mildew, scab, Alternaria blotch, ring rot, rust and bitter rot of Rosaceae crops such as apple and pear; brown rot of watermelon; brown blotted root rot of carrot; seedling blight and damping-off of rice, Leguminosae crops such as soybean, and vegetables such as lettuce, cucumber, tomato, cabbage, Chinese cabbage, etc., caused by *Fusarium* spp., *Pythium* spp. or *Rhizoctonia* spp.; cabbage *Verticillium* wilt; Chinese cabbage yellows; clubroot of Brassicaceae crops; *Pythium* blight, *Pythium* red blight and *Rhizoctonia* rot of turf grass; melon necrotic spot; rhizomania of sugar beet; lettuce big-vein disease, etc.

Now, preferred embodiments will be described below.

[1] An agricultural formulation comprising (a) difenoconazole and (b) at least one surfactant selected from the group consisting of a polycarboxylate-based surfactant and a lignosulfonate-based surfactant.

[2] The agricultural formulation according to [1], which contains (a) difenoconazole and (b) at least one surfactant selected from the group consisting of a polycarboxylate-based surfactant and a lignosulfonate-based surfactant in a weight ratio of from 1:300 to 300:1.

[3] The agricultural formulation according to [1] or [2], which contains (a) difenoconazole in an amount of from 0.3 to 90 wt % and (b) at least one surfactant selected from the group consisting of a polycarboxylate-based surfactant and a lignosulfonate-based surfactant in an amount of from 0.3 to 50 wt %, to the total amount of the agricultural formulation.

[4] The agricultural formulation according to any one of [1] to [3], wherein the agricultural formulation is a water-based suspension.

[5] The agricultural formulation according to any one of [1] to [4], which further contains other fungicide.

[6] The agricultural formulation according to [5], wherein the mixing weight ratio of (a) difenoconazole to other fungicide is from 1:100 to 100:1.

[7] The agricultural formulation according to [5] or [6], wherein other fungicide is at least one member selected from the group consisting of cyazofamid, amisulbrom, fluazinam, pyriofenone, metrafenone, isofetamid, boscalid and fluopyram.

[8] The agricultural formulation according to any one of [5] to [7], wherein other fungicide is at least one member selected from the group consisting of cyazofamid, pyriofenone and isofetamid.

[9] The agricultural formulation according to any one of [5] to [8], wherein other fungicide is cyazofamid.

[10] The agricultural formulation according to any one of [1] to [9], which further contains a dihydric alcohol.

[11] The agricultural formulation according to [10], wherein the dihydric alcohol is at least one member selected from the group consisting of ethylene glycol and propylene glycol.

[12] The agricultural formulation according to any one of [1] to [11], which further contains a natural saccharide as an anti-settling agent.

[13] The agricultural formulation according to [12], wherein the natural saccharide is at least one member selected from the group consisting of xanthan gum, rhamsan gum, Locust bean gum, carrageenan and Welan gum.

[14] The agricultural formulation according to any one of [1] to [13], which further contains an isothiazolinone compound as a preservative.

[15] The agricultural formulation according to [14], wherein the isothiazolinone compound is at least one member selected from the group consisting of benzisothiazolin-3-one, 2-methyl-4-isothiazolin-3-one, 5-chloro-2-methyl-4-isothiazolin-3-one and 4,5-dichloro-2-octyl-4-isothiazolin-3-one.

[16] The agricultural formulation according to any one of [1] to [15], which further contains a silicone oil as an antifoaming agent.

[17] The agricultural formulation according to [16], wherein the silicone oil is polydimethylsiloxane.

[18] A method for stabilizing an agricultural formulation containing (a) difenoconazole, which comprises adding (b) at least one surfactant selected from the group consisting of a polycarboxylate-based surfactant and a lignosulfonate-based surfactant to the agricultural formulation.

[19] The stabilizing method according to [18], which is to suppress a flowability decrease of the agricultural formulation.

[20] The stabilizing method according to [18] or [19], which is to suppress crystal growth of (a) difenoconazole.

[21] The stabilizing method according to any one of [18] to [20], wherein the mixing weight ratio of (a) difenoconazole and (b) at least one surfactant selected from the group consisting of a polycarboxylate-based surfactant and a lignosulfonate-based surfactant is from 1:300 to 300:1.

EXAMPLES

Now, examples of the present invention will be described, however, the present invention is by no means restricted thereto.

Example 1

(1) (a) Difenoconazole (active ingredient) (purity: 95.7%) 7.92 parts by weight
(2) (b) Ultrazine NA (tradename, sodium lignosulfonate) 2.0 parts by weight
(3) (b) Tersperse 2700 (tradename, sodium salt of acid resin copolymer) 3.0 parts by weight
(4) Propylene glycol 10.0 parts by weight
(5) VEEGUM R (tradename, magnesium aluminum silicate) 0.5 parts by weight
(6) SILFOAM SC120 (tradename, silicone oil) 0.5 parts by weight
(7) Rhodopol 23 (tradename, xanthan gum) 0.1 parts by weight
(8) Proxel GXL(S) (tradename, benzisothiazolin-3-one) 0.1 parts by weight
(9) Water 81.88 parts by weight The above components (1) to (3), (5), (6) and (9) were mixed, and the mixture was subjected to preliminary grinding by a homogenizer (manufactured by AS ONE Corporation) and to wet grinding by DYNO-MILL (manufactured by Willy A. Bachofen AG), and the components (4), (7) and (8) were added to obtain a water-based suspension.

Example 2

(1) (a) Difenoconazole (active ingredient) (purity: 95.7%) 7.92 parts by weight
(2) (b) Ultrazine NA (tradename, sodium lignosulfonate) 2.0 parts by weight
(3) (b) AQUALOC PM-006 (tradename, methacrylic acid polymer calcium salt) 3.0 parts by weight
(4) Propylene glycol 10.0 parts by weight
(5) VEEGUM R (tradename, magnesium aluminum silicate) 0.5 parts by weight
(6) SILFOAM SC120 (tradename, silicone oil) 0.5 parts by weight
(7) Rhodopol 23 (tradename, xanthan gum) 0.1 parts by weight
(8) Proxel GXL(S) (tradename, benzisothiazolin-3-one) 0.1 parts by weight
(9) Water 81.88 parts by weight The above components (1) to (3), (5), (6) and (9) were mixed, and the mixture was subjected to preliminary grinding by a homogenizer (manufactured by AS ONE Corporation) and to wet grinding by DYNO-MILL (manufactured by Willy A. Bachofen AG), and the components (4), (7) and (8) were added to obtain a water-based suspension.

Example 3

(1) (a) Difenoconazole (active ingredient) (purity: 95.7%) 7.92 parts by weight
(2) (b) Ultrazine NA (tradename, sodium lignosulfonate) 2.0 parts by weight
(3) (b) Atlox Metasperse 500L (tradename, styrene/acrylic acid polymer sodium salt) 3.0 parts by weight
(4) Propylene glycol 10.0 parts by weight
(5) VEEGUM R (tradename, magnesium aluminum silicate) 0.5 parts by weight (6) SILFOAM SC120 (tradename, silicone oil) 0.5 parts by weight
(7) Rhodopol 23 (tradename, xanthan gum) 0.1 parts by weight
(8) Proxel GXL(S) (tradename, benzisothiazolin-3-one) 0.1 parts by weight
(9) Water 81.88 parts by weight The above components (1) to (3), (5), (6) and (9) were mixed, and the mixture was subjected to preliminary grinding by a homogenizer (manufactured by AS ONE Corporation) and to wet grinding by DYNO-MILL (manufactured by Willy A. Bachofen AG), and the components (4), (7) and (8) were added to obtain a water-based suspension.

Example 4

(1) (a) Difenoconazole (active ingredient) (purity: 95.7%) 15.83 parts by weight
(2) (b) Ultrazine NA (tradename, sodium lignosulfonate) 2.0 parts by weight
(3) (b) Tersperse 2700 (tradename, sodium salt of acid resin copolymer) 3.0 parts by weight
(4) Propylene glycol 10.0 parts by weight
(5) VEEGUM R (tradename, magnesium aluminum silicate) 0.5 parts by weight
(6) SILFOAM SC120 (tradename, silicone oil) 0.5 parts by weight
(7) Rhodopol 23 (tradename, xanthan gum) 0.1 parts by weight
(8) Proxel GXL(S) (tradename, benzisothiazolin-3-one) 0.1 parts by weight
(9) Water 77.97 parts by weight The above components (1) to (3), (5), (6) and (9) were mixed, and the mixture was subjected to preliminary grinding by a homogenizer (manufactured by AS ONE Corporation) and to wet grinding by DYNO-MILL (manufactured by Willy A. Bachofen AG), and the components (4), (7) and (8) were added to obtain a water-based suspension.

Example 5

(1) (a) Difenoconazole (active ingredient) (purity: 95.7%) 42.22 parts by weight
(2) (b) Ultrazine NA (tradename, sodium lignosulfonate) 2.0 parts by weight
(3) (b) Tersperse 2700 (tradename, sodium salt of acid resin copolymer) 3.0 parts by weight
(4) Propylene glycol 10.0 parts by weight
(5) VEEGUM R (tradename, magnesium aluminum silicate) 0.5 parts by weight
(6) SILFOAM SC120 (tradename, silicone oil) 0.5 parts by weight
(7) Rhodopol 23 (tradename, xanthan gum) 0.1 parts by weight
(8) Proxel GXL(S) (tradename, benzisothiazolin-3-one) 0.1 parts by weight
(9) Water 51.58 parts by weight The above components (1) to (3), (5), (6) and (9) were mixed, and the mixture was subjected to preliminary grinding by a homogenizer (manufactured by AS ONE Corporation) and to wet grinding by DYNO-MILL (manufactured by Willy A. Bachofen AG), and the components (4), (7) and (8) were added to obtain a water-based suspension.

Example 6

(1) (a) Difenoconazole (active ingredient) (purity: 95.0%) 7.89 parts by weight
(2) Cyazofamid (active ingredient) (purity: 96.6%) 8.45 parts by weight
(3) (b) Ultrazine NA (tradename, sodium lignosulfonate) 3.0 parts by weight
(4) (b) Tersperse 2700 (tradename, sodium salt of acid resin copolymer) 3.0 parts by weight
(5) Propylene glycol 10.0 parts by weight
(6) VEEGUM R (tradename, magnesium aluminum silicate) 1.0 parts by weight
(7) Silcolapse 432 (tradename, polydimethylsiloxane oil) 0.5 parts by weight
(8) Rhodopol 23 (tradename, xanthan gum) 0.15 parts by weight
(9) Proxel GXL(S) (tradename, benzisothiazolin-3-one) 0.1 parts by weight
(10) Water 75.41 parts by weight The above components (1) to (4), (6), and (10) were mixed, and the mixture was subjected to preliminary grinding by a homogenizer (manufactured by AS ONE Corporation) and to wet grinding by DYNO-MILL (manufactured by Willy A. Bachofen AG), and the components (5), (8) and (9) were added to obtain a water-based suspension.

Example 7

(1) (a) Difenoconazole (active ingredient) (purity: 95.0%) 7.89 parts by weight
(2) Cyazofamid (active ingredient) (purity: 96.6%) 8.45 parts by weight
(3) (b) Ultrazine NA (tradename, sodium lignosulfonate) 3.0 parts by weight
(4) (b) Atlox Metasperse 550S (tradename, styrene/acrylic acid polymer sodium salt) 3.0 parts by weight
(5) Propylene glycol 10.0 parts by weight
(6) VEEGUM R (tradename, magnesium aluminum silicate) 1.0 parts by weight
(7) Silcolapse 432 (tradename, polydimethylsiloxane oil) 0.5 parts by weight
(8) Rhodopol 23 (tradename, xanthan gum) 0.15 parts by weight
(9) Proxel GXL(S) (tradename, benzisothiazolin-3-one) 0.1 parts by weight
(10) Water 75.41 parts by weight The above components (1) to (4), (6), and (10) were mixed, and the mixture was subjected to preliminary grinding by a homogenizer (manufactured by AS ONE Corporation) and to wet grinding by DYNO-MILL (manufactured by Willy A. Bachofen AG), and the components (5), (8) and (9) were added to obtain a water-based suspension.

Example 8

(1) (a) Difenoconazole (active ingredient) (purity: 95.0%) 7.89 parts by weight
(2) Cyazofamid (active ingredient) (purity: 96.6%) 8.45 parts by weight
(3) (b) Ultrazine NA (tradename, sodium lignosulfonate) 3.0 parts by weight
(4) (b) AQUALOC PM-006 (tradename, methacrylic acid polymer calcium salt) 3.0 parts by weight
(5) Propylene glycol 10.0 parts by weight
(6) VEEGUM R (tradename, magnesium aluminum silicate) 1.0 parts by weight (7) Silcolapse 432 (tradename, polydimethylsiloxane oil) 0.5 parts by weight
(8) Rhodopol 23 (tradename, xanthan gum) 0.15 parts by weight
(9) Proxel GXL(S) (tradename, benzisothiazolin-3-one) 0.1 parts by weight
(10) Water 75.41 parts by weight The above components (1) to (4), (6), (7) and (10) were mixed, and the mixture was subjected to preliminary grinding by a homogenizer (manufactured by AS ONE Corporation) and to wet grinding by DYNO-MILL (manufactured by Willy A. Bachofen AG), and the components (5), (8) and (9) were added to obtain a water-based suspension.

Example 9

(1) (a) Difenoconazole (active ingredient) (purity: 95.0%) 7.89 parts by weight
(2) Cyazofamid (active ingredient) (purity: 96.6%) 8.45 parts by weight
(3) (b) Borresperse CA (tradename, calcium lignosulfonate) 3.0 parts by weight
(4) (b) Tersperse 2700 (tradename, sodium salt of acid resin copolymer) 3.0 parts by weight
(5) Propylene glycol 10.0 parts by weight
(6) VEEGUM R (tradename, magnesium aluminum silicate) 1.0 parts by weight
(7) Silcolapse 432 (tradename, polydimethylsiloxane oil) 0.5 parts by weight
(8) Rhodopol 23 (tradename, xanthan gum) 0.15 parts by weight
(9) Proxel GXL(S) (tradename, benzisothiazolin-3-one) 0.1 parts by weight
(10) Water 75.41 parts by weight The above components (1) to (4), (6), (7) and (10) were mixed, and the mixture was subjected to preliminary grinding by a homogenizer (manufactured by AS ONE Corporation) and to wet grinding by DYNO-MILL (manufactured by Willy A. Bachofen AG), and the components (5), (8) and (9) were added to obtain a water-based suspension.

Example 10

(1) (a) Difenoconazole (active ingredient) (purity: 95.0%) 15.79 parts by weight
(2) Cyazofamid (active ingredient) (purity: 96.6%) 16.56 parts by weight
(3) (b) Ultrazine NA (tradename, sodium lignosulfonate) 2.0 parts by weight
(4) (b) Tersperse 2700 (tradename, sodium salt of acid resin copolymer) 3.0 parts by weight
(5) Propylene glycol 10.0 parts by weight
(6) VEEGUM R (tradename, magnesium aluminum silicate) 0.5 parts by weight
(7) SILFOAM SC120 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 57.45 parts by weight The above components (1) to (4), (6), (7) and (10) were mixed, and the mixture was subjected to preliminary grinding by a homogenizer (manufactured by AS ONE Corporation) and to wet grinding by DYNO-MILL (manufactured by Willy A. Bachofen AG), and the components (5), (8) and (9) were added to obtain a water-based suspension.

Example 11

(1) (a) Difenoconazole (active ingredient) (purity: 95.0%) 19.95 parts by weight
(2) Cyazofamid (active ingredient) (purity: 96.6%) 21.12 parts by weight
(3) (b) Ultrazine NA (tradename, sodium lignosulfonate) 1.0 parts by weight
(4) (b) Tersperse 2700 (tradename, sodium salt of acid resin copolymer) 3.0 parts by weight
(5) Propylene glycol 10.0 parts by weight
(6) VEEGUM R (tradename, magnesium aluminum silicate) 0.5 parts by weight
(7) SILFOAM SC120 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 53.73 parts by weight The above components (1) to (4), (6), (7) and (10) were mixed, and the mixture was subjected to preliminary grinding by a homogenizer (manufactured by AS ONE Corporation) and to wet grinding by DYNO-MILL (manufactured by Willy A. Bachofen AG), and the components (5), (8) and (9) were added to obtain a water-based suspension.

Example 12

(1) (a) Difenoconazole (active ingredient) (purity: 95.7%) 10.45 parts by weight
(2) Isofetamid (active ingredient) (purity: 96.6%) 20.70 parts by weight
(3) (b) Ultrazine NA (tradename, sodium lignosulfonate) 2.0 parts by weight
(4) (b) Tersperse 2700 (tradename, sodium salt of acid resin copolymer) 3.0 parts by weight
(5) Propylene glycol 10.0 parts by weight
(6) VEEGUM R (tradename, magnesium aluminum silicate) 0.5 parts by weight
(7) SILCOLAPSE 432 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 9.8 parts by weight
(11) Water 52.85 parts by weight The above components (1) to (7) and (11) were mixed, and the mixture was subjected to preliminary grinding by a homogenizer (manufactured by AS ONE Corporation) and to wet grinding by DYNO-MILL (manufactured by Willy A. Bachofen AG), and the components (8) to (10) were added to obtain a water-based suspension.

Example 13

(1) (a) Difenoconazole (active ingredient) (purity: 95.7%) 20.90 parts by weight
(2) Isofetamid (active ingredient) (purity: 96.6%) 10.35 parts by weight
(3) (b) Ultrazine NA (tradename, sodium lignosulfonate) 2.0 parts by weight (4) (b) Tersperse 2700 (tradename, sodium salt of acid resin copolymer) 3.0 parts by weight
(5) Propylene glycol 10.0 parts by weight
(6) VEEGUM R (tradename, magnesium aluminum silicate) 0.5 parts by weight
(7) SILCOLAPSE 432 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 9.8 parts by weight
(11) Water 52.75 parts by weight The above components (1) to (7) and (11) were mixed, and the mixture was subjected to preliminary grinding by a homogenizer (manufactured by AS ONE Corporation) and to wet grinding by DYNO-MILL (manufactured by Willy A. Bachofen AG), and the components (8) to (10) were added to obtain a water-based suspension.

Example 14

(1) (a) Difenoconazole (active ingredient) (purity: 95.7%) 10.45 parts by weight
(2) Pyriofenone (active ingredient) (purity: 99.7%) 20.06 parts by weight
(3) (b) Ultrazine NA (tradename, sodium lignosulfonate) 2.0 parts by weight
(4) (b) Tersperse 2700 (tradename, sodium salt of acid resin copolymer) 3.0 parts by weight
(5) Propylene glycol 10.0 parts by weight
(6) VEEGUM R (tradename, magnesium aluminum silicate) 0.5 parts by weight
(7) SILCOLAPSE 432 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 9.8 parts by weight
(11) Water 53.49 parts by weight The above components (1) to (7) and (11) were mixed, and the mixture was subjected to preliminary grinding by a homogenizer (manufactured by AS ONE Corporation) and to wet grinding by DYNO-MILL (manufactured by Willy A. Bachofen AG), and the components (8) to (10) were added to obtain a water-based suspension.

Example 15

(1) (a) Difenoconazole (active ingredient) (purity: 95.7%) 20.90 parts by weight
(2) Pyriofenone (active ingredient) (purity: 99.7%) 10.03 parts by weight
(3) (b) Ultrazine NA (tradename, sodium lignosulfonate) 2.0 parts by weight
(4) (b) Tersperse 2700 (tradename, sodium salt of acid resin copolymer) 3.0 parts by weight
(5) Propylene glycol 10.0 parts by weight
(6) VEEGUM R (tradename, magnesium aluminum silicate) 0.5 parts by weight
(7) SILCOLAPSE 432 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 9.8 parts by weight
(11) Water 53.07 parts by weight The above components (1) to (7) and (11) were mixed, and the mixture was subjected to preliminary grinding by a homogenizer (manufactured by AS ONE Corporation) and to wet grinding by DYNO-MILL (manufactured by Willy A. Bachofen AG), and the components (8) to (10) were added to obtain a water-based suspension.

Comparative Example 1

(1) (a) Difenoconazole (active ingredient) (purity: 95.0%) 42.10 parts by weight
(2) Soprophor FLK (tradename, polyoxyethylene tristyrylphenyl ether phosphate potassium salt) 2.0 parts by weight
(3) Supragil MNS-90 (tradename, methylnaphthalene sulfonate sodium salt) 2.0 parts by weight
(4) Propylene glycol 8.0 parts by weight
(5) VEEGUM R (tradename, magnesium aluminum silicate) 1.0 parts by weight
(6) Silcolapse 432 (tradename, polydimethylsiloxane oil) 0.3 parts by weight
(7) Rhodopol 23 (tradename, xanthan gum) 0.1 parts by weight
(8) Proxel GXL(S) (tradename, benzisothiazolin-3-one) 0.1 parts by weight
(9) Water 64.4 parts by weight The above components (1) to (3), (5), (6) and (9) were mixed, and the mixture was subjected to preliminary grinding by a homogenizer (manufactured by AS ONE Corporation) and to wet grinding by DYNO-MILL (manufactured by Willy A. Bachofen AG), and the components (4), (7) and (8) were added to obtain a water-based suspension.

Comparative Example 2

(1) (a) Difenoconazole (active ingredient) (purity: 95.0%) 7.89 parts by weight
(2) Cyazofamid (active ingredient) (purity: 96.6%) 8.45 parts by weight
(3) Morwet D-425(P) (tradename, sodium alkylnaphthalene sulfonate condensed with formaldehyde) 3.0 parts by weight
(4) Soprophor FLK (tradename, polyoxyethylene tristyrylphenyl ether phosphate potassium salt) 3.0 parts by weight
(5) Propylene glycol 10.0 parts by weight
(6) VEEGUM R (tradename, magnesium aluminum silicate) 1.0 parts by weight
(7) Silcolapse 432 (tradename, polydimethylsiloxane oil) 0.5 parts by weight
(8) Rhodopol 23 (tradename, xanthan gum) 0.15 parts by weight
(9) Proxel GXL(S) (tradename, benzisothiazolin-3-one) 0.1 parts by weight
(10) Water 75.41 parts by weight The above components (1) to (4), (6), (7) and (10) were mixed, and the mixture was subjected to preliminary grinding by a homogenizer (manufactured by AS ONE Corporation) and to wet grinding by DYNO-MILL (manufactured by Willy A. Bachofen AG), and the components (5), (8) and (9) were added to obtain a water-based suspension.

Comparative Example 3

(1) (a) Difenoconazole (active ingredient) (purity: 95.7%) 10.45 parts by weight
(2) Isofetamid (active ingredient) (purity: 96.6%) 20.70 parts by weight
(3) Morwet D-425(P) (tradename, sodium alkylnaphthalene sulfonate condensed with formaldehyde) 2.0 parts by weight
(4) Soprophor FLK (tradename, polyoxyethylene tristyrylphenyl ether phosphate potassium salt) 3.0 parts by weight
(5) Propylene glycol 10.0 parts by weight
(6) VEEGUM R (tradename, magnesium aluminum silicate) 0.5 parts by weight
(7) SILCOLAPSE 432 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 9.8 parts by weight
(11) Water 52.85 parts by weight The above components (1) to (7) and (11) were mixed, and the mixture was subjected to preliminary grinding by a homogenizer (manufactured by AS ONE Corporation) and to wet grinding by DYNO-MILL (manufactured by Willy A. Bachofen AG), and the components (8) to (10) were added to obtain a water-based suspension.

Comparative Example 4

(1) (a) Difenoconazole (active ingredient) (purity: 95.7%) 20.90 parts by weight
(2) Isofetamid (active ingredient) (purity: 96.6%) 10.35 parts by weight
(3) Morwet D-425(P) (tradename, sodium alkylnaphthalene sulfonate condensed with formaldehyde) 2.0 parts by weight
(4) Soprophor FLK (tradename, polyoxyethylene tristyrylphenyl ether phosphate potassium salt) 3.0 parts by weight
(5) Propylene glycol 10.0 parts by weight
(6) VEEGUM R (tradename, magnesium aluminum silicate) 0.5 parts by weight
(7) SILCOLAPSE 432 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 9.8 parts by weight
(11) Water 52.75 parts by weight The above components (1) to (7) and (11) were mixed, and the mixture was subjected to preliminary grinding by a homogenizer (manufactured by AS ONE Corporation) and to wet grinding by DYNO-MILL (manufactured by Willy A. Bachofen AG), and the components (8) to (10) were added to obtain a water-based suspension.

Comparative Example 5

(1) (a) Difenoconazole (active ingredient) (purity: 95.7%) 10.45 parts by weight
(2) Pyriofenone (active ingredient) (purity: 99.7%) 20.06 parts by weight
(3) Morwet D-425(P) (tradename, sodium alkylnaphthalene sulfonate condensed with formaldehyde) 2.0 parts by weight
(4) Soprophor FLK (tradename, polyoxyethylene tristyrylphenyl ether phosphate potassium salt) 3.0 parts by weight
(5) Propylene glycol 10.0 parts by weight
(6) VEEGUM R (tradename, magnesium aluminum silicate) 0.5 parts by weight
(7) SILCOLAPSE 432 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 9.8 parts by weight
(11) Water 53.49 parts by weight The above components (1) to (7) and (11) were mixed, and the mixture was subjected to preliminary grinding by a homogenizer (manufactured by AS ONE Corporation) and to wet grinding by DYNO-MILL (manufactured by Willy A. Bachofen AG), and the components (8) to (10) were added to obtain a water-based suspension.

Comparative Example 6

(1) (a) Difenoconazole (active ingredient) (purity: 95.7%) 20.90 parts by weight
(2) Pyriofenone (active ingredient) (purity: 99.7%) 10.03 parts by weight
(3) Morwet D-425(P) (tradename, sodium alkylnaphthalene sulfonate condensed with formaldehyde) 2.0 parts by weight
(4) Soprophor FLK (tradename, polyoxyethylene tristyrylphenyl ether phosphate potassium salt) 3.0 parts by weight
(5) Propylene glycol 10.0 parts by weight
(6) VEEGUM R (tradename, magnesium aluminum silicate) 0.5 parts by weight
(7) SILCOLAPSE 432 (tradename, silicone oil) 0.5 parts by weight
(8) Rhodopol 23 (tradename, xanthan gum) 0.1 parts by weight
(9) Proxel GXL(S) (tradename, benzisothiazolin-3-one) 0.1 parts by weight
(10) Water 9.8 parts by weight
(11) Water 53.07 parts by weight The above components (1) to (7) and (11) were mixed, and the mixture was subjected to preliminary grinding by a homogenizer (manufactured by AS ONE Corporation) and to wet grinding by DYNO-MILL (manufactured by Willy A. Bachofen AG), and the components (8) to (10) were added to obtain a water-based suspension,

Test Example 1

A 30 ml glass bottle was filled with the water-based suspension obtained in each of Examples 1 to 5 and Comparative Example 1 and capped, and stored in a 54° C. thermostat for 14 days.

As the average particle size of the active ingredient in the water-based suspension before and after the storage, the particle size distribution was measured by MICROTRAC MT3300-EXII (manufactured by NIKKISO CO., LTD.) to obtain the volume average particle size, and the change with time of the volume average particle size was taken as "crystal growth factor". The results are shown in Table 1.

Further, the flowability of the water-based suspension after the storage was evaluated based on the following standards, and the results are shown in Table 1.

○: the suspension flows when turned 90°, and becomes uniform after turned totally ten times.

Δ: the suspension flows when turned 90° in a gel state, and returns to a liquid state after turned totally ten times.

X: the suspension is formed into a hard cake.

Further, the viscosity of the water-based suspension before and after the storage was measured by a viscometer (TVB-10, M2 rotor or M3, 60 rpm, 20° C.), and the results are shown in Table 2.

TABLE 1

|  | Flowability | Volume average particle size (μm) | | Crystal growth factor |
|---|---|---|---|---|
|  |  | Initial size | 54° C., 2 weeks |  |
| Example 1 | ○ | 0.91 | 1.00 | 1.1 |
| Example 2 | ○ | 1.02 | 1.44 | 1.4 |
| Example 3 | ○ | 0.99 | 1.05 | 1.1 |
| Example 4 | ○ | 0.71 | 0.89 | 1.3 |
| Example 5 | ○ | 0.95 | 1.29 | 1.4 |
| Comparative Example 1 | Δ | 1.80 | Aggregated | — |

TABLE 2

|  | Viscosity (mPa·s) | | Viscosity increase (%) |
|---|---|---|---|
|  | Initial viscosity | 54° C., 2 weeks |  |
| Example 1 | 59 | 61 | 3.4 |
| Example 2 | 69 | 68 | −1.4 |
| Example 3 | 47 | 47 | 0.0 |
| Example 4 | 71 | 73 | 2.8 |
| Example 5 | 286 | 276 | −3.5 |
| Comparative Example 1 | 140 | 700 | 400 |

Test Example 2

In accordance with Test Example 1, changes as between before and after the storage of the water-based suspension obtained in each of Examples 6 to 11 and Comparative Example 2 were evaluated. The results are shown in Tables 3 and 4.

TABLE 3

|  | Flowability | Volume average particle size (μm) | | Crystal growth factor |
|---|---|---|---|---|
|  |  | Initial size | 54° C., 2 weeks |  |
| Example 6 | ○ | 1.00 | 1.61 | 1.6 |
| Example 7 | ○ | 0.92 | 1.73 | 1.9 |
| Example 8 | ○ | 0.98 | 2.24 | 2.3 |
| Example 9 | ○ | 0.97 | 1.44 | 1.5 |
| Example 10 | ○ | 1.03 | 1.66 | 1.6 |
| Example 11 | Δ | 1.01 | 1.81 | 1.8 |
| Comparative Example 2 | x | 0.95 | 52.26 | 55.0 |

TABLE 4

|  | Viscosity (mPa·s) | | Viscosity increase (%) |
|---|---|---|---|
|  | Initial viscosity | 54° C., 2 weeks |  |
| Example 10 | 159 | 157 | −1.3 |
| Example 11 | 255 | 237 | −7.1 |

Test Example 3

In accordance with Test Example 1, changes as between before and after the storage of the water-based suspension obtained in each of Examples 12 and 13 and Comparative Examples 3 and 4 were evaluated, The results are shown in Tables 5 and 6.

TABLE 5

|  | Flowability | Volume average particle size (μm) | | Crystal growth factor |
|---|---|---|---|---|
|  |  | Initial size | 54° C., 2 weeks |  |
| Example 12 | ○ | 1.95 | 2.32 | 1.19 |
| Example 13 | ○ | 1.78 | 2.98 | 1.67 |
| Comparative Example 3 | x | 1.91 | Not measurable | — |
| Comparative Example 4 | x | 1.95 | Not measurable | — |

TABLE 6

|  | Viscosity (mPa·s) | | Viscosity increase (%) |
|---|---|---|---|
|  | Initial viscosity | 54° C., 2 weeks |  |
| Example 12 | 136.1 | 133.0 | 97.7 |
| Example 13 | 132.3 | 137.7 | 104.1 |
| Comparative Example 3 | 106.5 | Not measurable | — |
| Comparative Example 4 | 93.2 | Not measurable | — |

Test Example 5

In accordance with Test Example 1, changes as between before and after the storage of the water-based suspension obtained in each of Examples 14 and 15 and Comparative Examples 5 and 6 were evaluated. The results are shown in Tables 7 and 8.

TABLE 7

|  | Flowability | Volume average particle size (μm) | | Crystal growth factor |
|---|---|---|---|---|
|  |  | Initial size | 54° C., 2 weeks |  |
| Example 14 | ○ | 1.87 | 4.39 | 2.35 |
| Example 15 | ○ | 1.87 | 7.34 | 3.93 |
| Comparative Example 5 | Δ | 1.93 | 25.25 | 13.08 |
| Comparative Example 6 | Δ | 1.86 | 108.84 | 58.52 |

TABLE 8

| | Viscosity (mPa · s) | | Viscosity |
| | Initial viscosity | 54° C., 2 weeks | increase (%) |
|---|---|---|---|
| Example 14 | 121.8 | 151.2 | 124.1 |
| Example 15 | 122.0 | 153.9 | 126.1 |
| Comparative Example 5 | 101.7 | 268.4 | 263.9 |
| Comparative Example 6 | 101.4 | 149.0 | 146.9 |

The entire disclosure of Japanese Patent Application No. 2019-019113 filed on Feb. 5, 2019 including specification, claims and abstract is incorporated herein by reference in its entirety.

The invention claimed is:

1. An agricultural formulation comprising
   (a) difenoconazole, and
   (b) at least one surfactant selected from the group consisting of a polycarboxylate-containing surfactant and a lignosulfonate-containing surfactant,
   wherein the agricultural formulation contains (a) the difenoconazole and (b) the at least one surfactant selected from the group consisting of a polycarboxylate-containing surfactant and a lignosulfonate-containing surfactant in a weight ratio from 1:10 to 10:1.

2. The agricultural formulation according to claim 1, which contains (a) difenoconazole in an amount from 0.3 to 90 wt % and (b) at least one surfactant selected from the group consisting of a polycarboxylate-containing surfactant and a lignosulfonate-containing surfactant in an amount from 0.3 to 50 wt %, to the total amount of the agricultural formulation.

3. The agricultural formulation according to claim 1, wherein the agricultural formulation is an aqueous suspension.

4. The agricultural formulation according to claim 1, which further contains another fungicide.

5. The agricultural formulation according to claim 4, wherein the other fungicide is at least one member selected from the group consisting of cyazofamid, pyriofenone and isofetamid.

6. The agricultural formulation according to claim 4, wherein the other fungicide is cyazofamid.

7. A method for stabilizing an agricultural formulation containing (a) difenoconazole, comprising:
   adding (b) at least one surfactant selected from the group consisting of a polycarboxylate-containing surfactant and a lignosulfonate-containing surfactant to the agricultural formulation,
   wherein the agricultural formulation contains (a) the difenoconazole and (b) the at least one surfactant selected from the group consisting of a polycarboxylate-containing surfactant and a lignosulfonate-containing surfactant in a weight ratio from 1:10 to 10:1.

8. The stabilizing method according to claim 7, which is to suppress a flowability decrease of the agricultural formulation.

9. The stabilizing method according to claim 7, which is to suppress crystal growth of (a) difenoconazole.

10. The agricultural formulation according to claim 1,
    wherein the content of (a) difenoconazole to the total amount of the agricultural formulation is from 0.5 to 80 wt %, and
    wherein the content of (b) the surfactant to the total amount of the agricultural formulation is from 0.5 to 20 wt %.

11. The agricultural formulation according to claim 1,
    wherein the content of (a) difenoconazole to the total amount of the agricultural formulation is from 0.5 to 50 wt %, and
    wherein the content of (b) the surfactant to the total amount of the agricultural formulation is from 1 to 10 wt %.

12. The stabilizing method according to claim 7,
    wherein the content of (a) difenoconazole to the total amount of the agricultural formulation is from 0.5 to 80 wt %, and
    wherein the content of (b) the surfactant to the total amount of the agricultural formulation is from 0.5 to 20 wt %.

13. The stabilizing method according to claim 7,
    wherein the content of (a) difenoconazole to the total amount of the agricultural formulation is from 0.5 to 50 wt %, and
    wherein the content of (b) the surfactant to the total amount of the agricultural formulation is from 1 to 10 wt %.

14. The agricultural formulation according to claim 1, further comprising a dihydric alcohol.

15. The agricultural formulation according to claim 1, further comprising a natural saccharide.

16. The agricultural formulation according to claim 1, further comprising an isothiazolinone compound.

17. The stabilizing method of claim 7, wherein the agricultural formulation further comprises a dihydric alcohol.

18. The stabilizing method of claim 7, wherein the agricultural formulation further comprises a natural saccharide.

19. The stabilizing method of claim 7, wherein the agricultural formulation further comprises an isothiazolinone compound.

* * * * *